United States Patent
Hsu et al.

(10) Patent No.: US 7,236,437 B2
(45) Date of Patent: Jun. 26, 2007

(54) SHOCK DETECTOR FOR OPTICAL DISC RECORDERS AND SHOCK-PROOF RECORDING METHOD USING SHOCK SIGNAL

(75) Inventors: Jin-Chuan Hsu, Hsinchu (TW); Jyh-Shin Pan, Hsin Chu County (TW); Chih-Yuan Chen, Chang Hua County (TW)

(73) Assignee: Mediatek Inc., Hsin Chu (TW)

( * ) Notice: Subject to any disclaimer, the term of this patent is extended or adjusted under 35 U.S.C. 154(b) by 667 days.

(21) Appl. No.: 10/679,441

(22) Filed: Oct. 7, 2003

(65) Prior Publication Data

US 2004/0069962 A1    Apr. 15, 2004

(30) Foreign Application Priority Data

Oct. 9, 2002    (TW) ................................ 91123388 A

(51) Int. Cl.
G11B 7/00    (2006.01)
G11B 11/00    (2006.01)

(52) U.S. Cl. ................................. 369/53.18; 369/44.32

(58) Field of Classification Search ............. 369/53.18, 369/44.32
See application file for complete search history.

(56) References Cited

U.S. PATENT DOCUMENTS

| | | | | |
|---|---|---|---|---|
| 4,703,468 A * | 10/1987 | Baba et al. | ............... | 369/44.32 |
| 4,722,079 A * | 1/1988 | Matsumoto | ............... | 369/44.32 |
| 5,212,678 A * | 5/1993 | Roth et al. | ................ | 369/47.33 |
| 5,634,031 A * | 5/1997 | Sakuma | ....................... | 711/111 |
| 5,835,463 A * | 11/1998 | Teshirogi et al. | ........ | 369/47.44 |
| 5,867,461 A * | 2/1999 | Baas | ........................ | 369/44.32 |
| 5,886,966 A * | 3/1999 | Ota et al. | ................. | 369/53.18 |
| 6,775,211 B1 * | 8/2004 | Tsukihashi | ............... | 369/47.28 |
| 6,930,964 B2 * | 8/2005 | Matsui | ....................... | 369/47.3 |
| 7,023,781 B2 * | 4/2006 | Tsuji | ....................... | 369/53.31 |
| 7,099,246 B2 * | 8/2006 | Hayashi et al. | .......... | 369/47.33 |
| 2002/0048240 A1 * | 4/2002 | Pan et al. | ................ | 369/47.31 |
| 2003/0198157 A1 * | 10/2003 | Smith | ........................ | 369/53.3 |

* cited by examiner

*Primary Examiner*—Wayne Young
*Assistant Examiner*—LaTanya Bibbins
(74) *Attorney, Agent, or Firm*—Birch, Stewart, Kolasch & Birch, LLP

(57) ABSTRACT

A shock detector for an optical disc recorder and method for controlling the recording using a shock signal. The shock detector includes a first detecting unit for detecting the amplitude of a first kind of reference signal passing through a band-pass filter and outputting a first detecting signal, a second detecting unit for detecting the level of a second kind of reference signal and outputting a second detecting signal, a third detecting unit for detecting the revolution of a third kind of reference signal and outputting a third detecting signal, and a judging unit for receiving the first detecting signal, the second detecting signal and the third detecting signal, and enabling a shock signal when the first detecting signal, the second detecting signal and the third detecting signal are simultaneously enabled. Therefore, the shock detector does not need an additional shock sensor.

21 Claims, 3 Drawing Sheets

SHOCK DETECTOR FOR OPTICAL DISC RECORDERS AND SHOCK-PROOF RECORDING METHOD USING SHOCK SIGNAL

This Nonprovisional application claims priority under 35 U.S.C. § 119(a) on Patent Application No(s). 091123388 filed in Taiwan on Oct. 9, 2002, the entire contents of which are hereby incorporated by reference.

BACKGROUND OF THE INVENTION

1. Field of the Invention

The invention relates to a shock detection and shock-proof apparatus for an optical disc recorder, and more particularly to a shock detector for an optical disc recorder capable of detecting the shock level of the recorder without using an additional shock sensor, and an apparatus for controlling link recording when the shock level is greater than a threshold to protect the recording quality.

2. Description of the Related Art

The optical disk recorders, such as the CD-RW recorders and the DVD recorders, have become more and more popular recently. They are widely applied in various environments including many conditions full of vibrations. Consequently, to ensure the data integrity, the recorder must have the shock proof function to keep the best recording quality when the recorder is suffering impact or shock during recording.

The current technology mostly utilizes a shock sensor to detect the external impact applied to the recorder, and increases the gain of the servo controller to enhance the system's shock resistance. For example, U.S. Pat. No. 6,219,317 entitled "Optical disc recording and/or reproducing apparatus and method" has disclosed an apparatus and a method using a shock sensor to detect the shock level and switching the gain of a tracking/focus-locking servo controller to make the gain of the servo controller greater to enhance the shock resistance as the shock is greater than a threshold. However, because the method is recording data while the disk driver is impact, this method cannot ensure that the objective lens of the optical head is always kept at a correct tracking/focus-locking position, and thus the reading and recording quality of the disc cannot be assured. In addition, this method needs an additional shock sensor to detect the shock level, so that the cost is higher and the assembling processes are more complicated.

SUMMARY OF THE INVENTION

In view of the above-mentioned problems, an object of the invention is to provide a shock detector for an optical disc recorder, which generates a shock signal by utilizing signals having generated in the current optical disc recorder system.

Another object of the invention is to provide a shock proof recording method using a shock signal to control the optical disc recording.

To achieve the above-mentioned objects, a shock detector for an optical disc recorder of the present invention includes a first detecting unit for detecting the amplitude of a first kind of reference signal passing through a band-pass filter and outputting a first detecting signal, a second detecting unit for detecting the level of a second kind of reference signal and outputting a second detecting signal, a third detecting unit for detecting the revolution of a third kind of reference signal and outputting a third detecting signal, and a judging unit for receiving the first, the second and the third detecting signals, and enabling a shock signal when the first, the second and the third detecting signals are simultaneously enabled.

The first kind of reference signal includes the tracking error signal, the focusing error signal, and the central error signal. The second kind of reference signal includes the sub-beam sum signal and the RF ripple signal. The third kind of reference signal includes the rotating frequency identifying signal of a spindle motor.

DETAILED DESCRIPTION OF THE INVENTION

The shock detector for optical disc recorders and the shock proof control method using the same will be described with reference to the accompanying drawings.

The "shock proof" is defined hereafter as the following. During recording situation, a recorder uses a shock detection scheme to monitor the external impact applied to the recorder, and judges the strength of the shock. If the shock is stronger than a threshold level, the recording action will be stopped and a link procedure will be active to avoid recording during the shock period. After the shock level decreased and is smaller than a safe level, the recorder is controlled to seek the link zone at which the previous recording is stopped and to enable the link recording and to continue recording.

In general, when the recorder is reading or recording, some feedback control signals are provided, such as the tracking error signal TE, the focusing error signal FE, the central error signal CS (or referred to as a main push pull signal MPP), the sub-beam sum signal SBAD, the RF ripple signal RFRP, and the rotating frequency identifying signal of spindle motor FG Among these control signals, when the recorder is impacted, a resonant frequency will be added to the control signals such as the tracking error signal TE, the focusing error signal FE and the central error signal CS, the levels of the sub-beam sum signal SBAD and the RF ripple signal RFRP will be changed, and the frequency of the frequency identifying signal FG will also be changed. The invention utilizes the combinations of these signals to judge whether the shock is occurred.

Figure 1:
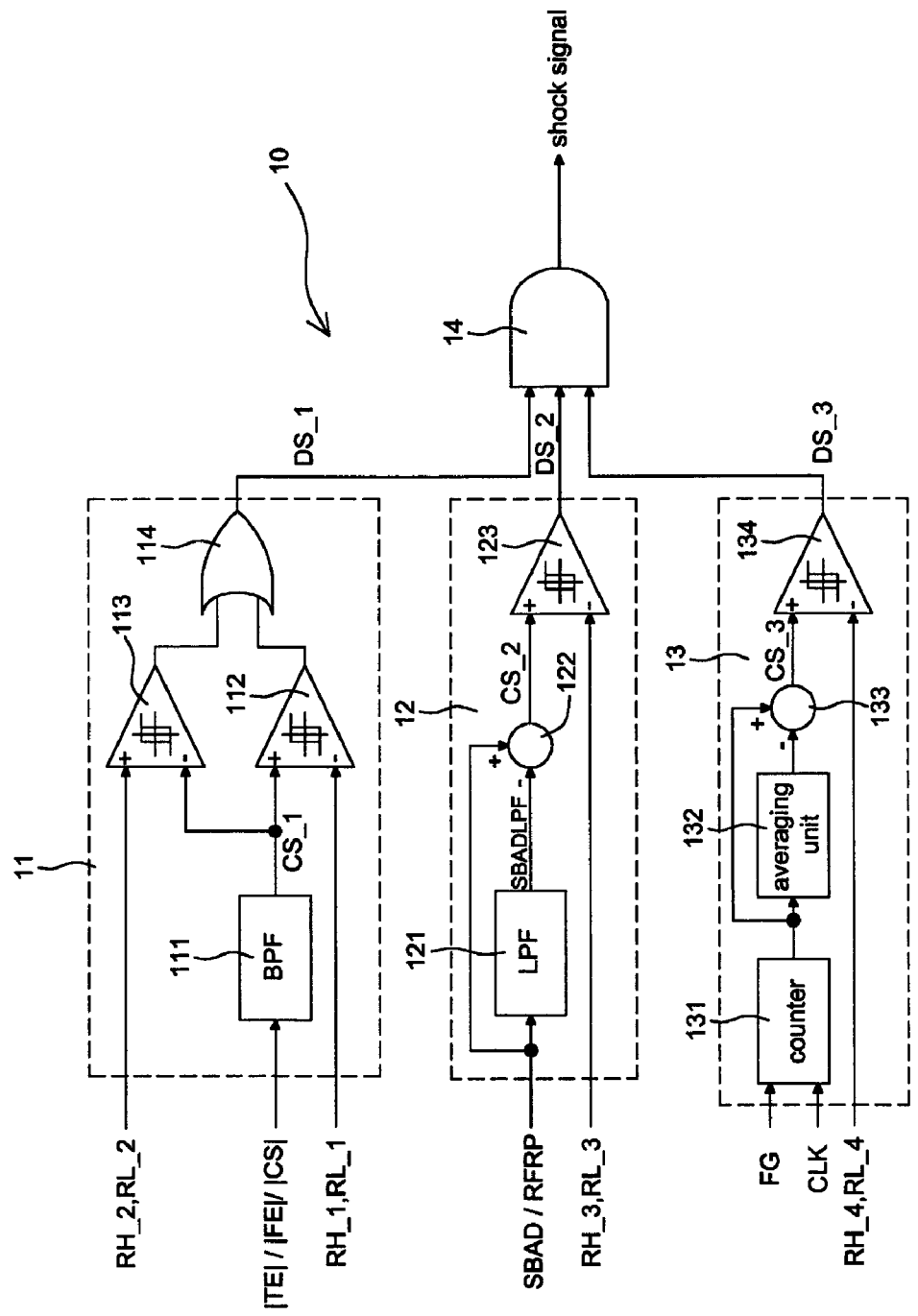
FIG. 1 is a block diagram of a shock detector of an optical disc recorder of the present invention.

FIG. 1 is a block diagram of a shock detector of an optical disc recorder of the present invention. Referring to FIG. 1, the shock detector 10 for the optical disc recorder includes a first detecting unit 11, a second detecting unit 12 and a third detecting unit 13 for detecting different kinds of signals, respectively, and an AND gate 14 for integrating output signals from each detecting unit and generating a shock signal.

The first detecting unit 11 includes a band-pass filter 111, two hysteresis comparators 112 and 113, and an OR gate 114. The first detecting unit 11 receives a first kind control signal, such as the tracking error signal TE, the focusing error signal FE or the central error signal CS, and detects the amplitudes of the first kind control signal passing through the band-pass filter. Since the frequencies of the tracking error signal TE, the focusing error signal FE, and the central error signal CS will include a resonant frequency when the optical disc recorder is impacted, the first detecting unit 11 utilizes a band-pass filter 111 to extract the resonant frequency components caused by the impact and to generate a first eigenvalue CS_1. The frequency range of the band-pass filter 111 may be configured according to the resonant frequency of the loader's mechanism. Then, the first detecting unit 11 utilizes the first and second hysteresis comparators 112 and 113 to compare the first eigenvalue CS_1 with a first set of threshold values RH_1, RL_1 and a second set of threshold values RH_2, RL_2, respectively, and outputs a first detecting signal DS_1. The first high threshold value RH_1 is greater than the first low threshold value RL_1, and the second high threshold value RH_2 is greater than the second low threshold value RL_2. The OR gate 114 receives the outputs from the first and second hysteresis comparators 112 and 113, and generates the first detecting signal DS_1. When the first eigenvalue CS_1 is greater than the first high threshold value RH_1 or smaller than a second low threshold value RL_2, the first detecting signal DS_1 is H; and when the first eigenvalue CS_1 is smaller than a first low threshold value RL_1 and greater than a second high threshold value RH_2, the first detecting signal DS_1 is L. The first detecting signal DS_1 is kept unchanged in other conditions. The hysteresis comparators are used in order to prevent the first detecting signal DS_1 from changing too frequently. Of course, typical comparators can also be used to replace the hysteresis comparators. If the typical comparators are used, the first high threshold value RH_1 equals to the first low threshold value RL_1 and the second high threshold value RH_2 equals to the second low threshold value RL_2.

The second detecting unit 12 includes a low-pass filter 121, a subtracter 122 and a hysteresis comparator 123. The second detecting unit 12 receives a second kind control signal, such as the sub-beam sum signal SBAD or the RF ripple signal (RFRP), and detects the level of the second kind control signal. Since the level of the sub-beam sum signal SBAD and the RF ripple signal (RFRP) will be changed when the optical disc recorder is impacted, the second detecting unit 12 utilizes the low-pass filter 121 to extract a level average SBADLPF, and utilizes a subtracter 122 to compute a difference between the average SBADLPF and the second kind control signal to generate a second eigenvalue CS_2. Then, the second detecting unit 12 utilizes the hysteresis comparator 123 to compare the second eigenvalue CS_2 with a third set of threshold values RH_3, RL_3, and to output a second detecting signal DS_2. The third high threshold value RH_3 is greater than the third low threshold value RL_3. When the second eigenvalue CS_2 is greater than the third high threshold value RH_3, the second detecting signal DS_2 is H; and when the second eigenvalue CS_2 is smaller than the third low threshold value RL_3, the second detecting signal DS_2 is L. Using the hysteresis comparator 123 can prevent the second detecting signal DS_2 from changing too frequently. Of course, a typical comparator can be used to replace the hysteresis comparator. If a typical comparator is used, the third high threshold value RH_3 equals to the third low threshold value RL_3.

The third detecting unit 13 includes a counter 131, an averaging unit 132, a subtracter 133, and a hysteresis comparator 134. The third detecting unit 13 receives a third kind control signal, such as the rotating frequency identifying signal F, and detects the pulse length of the third kind control signal. Since the pulse length of the frequency identifying signal FG will be changed when the optical disc recorder is impacted, the third detecting unit 13 utilizes the counter 131 to detect the length of each pulse of the third kind control signal, and utilizes the averaging unit 132 to average the pulse lengths. The counter 131 counts the pulse number of a high-frequency clock for each pulse of the third kind control signal and outputs the count value as the pulse length. Thereafter, the third detecting unit 13 utilizes the subtracter 133 to compute the differences between each pulse length and the average length and to generate a third eigenvalue CS_3. The third detecting unit 13 utilizes the hysteresis comparator 134 to compare the third eigenvalue CS_3 with a fourth set of threshold values RH_4, RL_4, and to output a third detecting signal DS_3, wherein the fourth high threshold value RH_4 is greater than the fourth low threshold value RL_4. When the third eigenvalue CS_3 is greater than the fourth high threshold value RH_4, the third detecting signal DS_3 is H; and when the third eigenvalue CS_3 is smaller than the fourth low threshold value RL_4, the third detecting signal DS_3 is L. The hysteresis comparator is used to prevent the third detecting signal DS_3 from changing too frequently. Of course, a typical comparator also may be used to replace the hysteresis comparator. If a typical comparator is used, the fourth high threshold value RH_4 equals to the fourth low threshold value RL_4.

Since a scratched zone on the optical disc may also cause some control signals to be changed, such that the first detecting signal DS_1 and the second detecting signal DS_2 are enabled, misjudgment may be made if the shock signal is generated according only to the first detecting signal DS_1 and the second detecting signal DS_2. Consequently, the shock detector 10 utilizes the AND gate 14 to integrate three detecting signals DS_1, DS_2 and DS_3 to avoid misjudgment. In addition, when the optical disc recorder is impacted, the three detecting signals DS_1, DS_2 and DS_3 will also be enabled, and no shock condition will be missed. Of course, the first detecting unit 11 of this embodiment is adapted to detecting the control signal, such as the tracking error signal TE, the focusing error signal FE, and the central error signal CS, so it is possible to only detect one of the signals. The second detecting unit 12 of this embodiment is adapted to detecting the sub-beam sum signal SBAD and the RF ripple signal (RFRP), so it is possible to only detect one of the signals.

Figure 2:
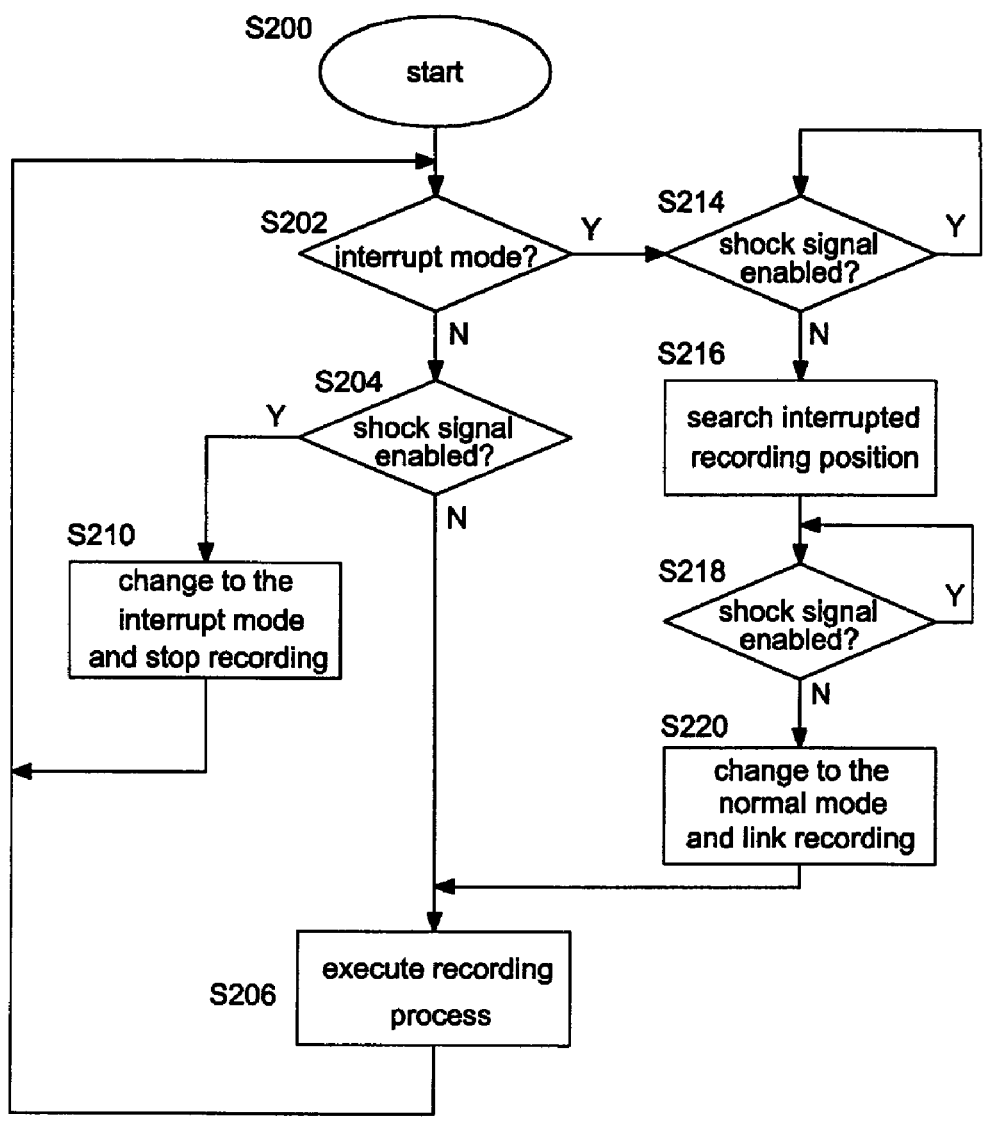
FIG. 2 shows a flow chart for controlling the recording of the write-once optical disc according to a shock signal of the present invention.

FIG. 2 shows a flow chart of a controlling method for controlling the recording process of the write-once optical disc (e.g., CD-R, DVD-R) according to a shock signal. Referring to FIG. 2, the control method includes the following steps.

Step S200: start the recording process.

Step S202: detect the recording mode. If the recording mode is an interrupt mode, jump to step S214. If the recording mode is a normal mode, execute the step S204.

Step S204: detect the shock signal. If the shock signal is enabled, jump to step S210. If the shock signal is not enabled, execute the step S206.

Step S206: execute recording process and jump back to step S202.

Step S210: change the recording mode to the interrupt mode and set a high gain to the servo-loop. Then, enable a stop recording process and jump back to step S202.

Step S214: detect the shock signal. If the shock signal is enabled, repeat the step S214. If the shock signal is disabled, execute the next step S216.

Step S216: search the interrupted position.

Step S218: detect the shock signal. If the shock signal is enabled, repeat the step S218. If the shock signal is disabled, execute the next step S220.

Step S220: change the recording mode to the normal mode and set a low gain to the servo-loop. Then, enable a link recording process and jump back to step S206.

Figure 3:
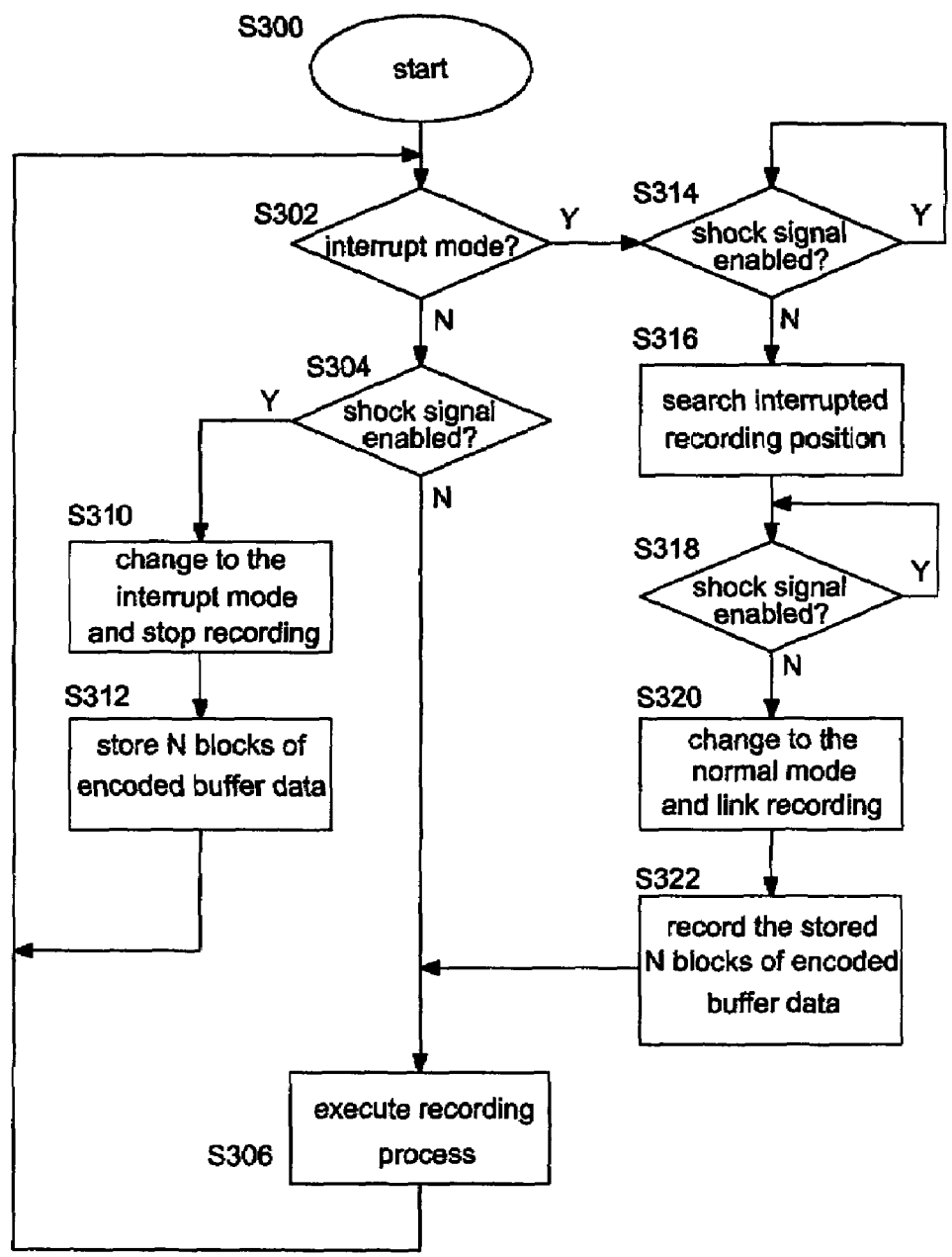
FIG. 3 shows a flow chart for controlling the recording of the rewritable optical disc according to a shock signal of the present invention.

FIG. 3 shows a flow chart of a controlling method for controlling the rewritable optical disc (e.g., CD-RW, DVD+/−RW) recording according to a shock signal. Referring to FIG. 3, the control method includes the following steps.

Step S300: start the recording process.

Step S302: detect the recording mode. If the recording mode is an interrupt mode, jump to step S314. If the recording mode is a normal mode, execute the step S304.

Step S304: detect the shock signal. If the shock signal is enabled, jump to step S310. If the shock signal is not enabled, execute the step S306.

Step S306: execute normal recording process and jump back to step S302.

Step S310: change the recording mode to the interrupt mode and set a high gain to the servo-loop. Then, enable a stop recording process.

Step S312: store N blocks of encoded buffer data as repeated writing data when the link recording process is enabled. Jump back to step S302.

Step S314: detect the shock signal. If the shock signal is enabled, repeat the step S314. If the shock signal is disabled, execute the next step S316.

Step S316: search the interrupted recording position.

Step S318: detect the shock signal. If the shock signal is enabled, repeat the step S318. If the shock signal is disabled, execute the next step S320.

Step S320: change the recording mode to the normal mode and set a low gain to the servo-loop. Then, enable a link recording process.

Step S322: start recording the stored N blocks of encoded buffer data from the position of the N-th block before the interrupted recording position. Jump back to step S306 to execute normal recording process.

The difference between the shock proof method for the write-once optical disc of FIG. 2 and that for the rewritable optical disc of FIG. 3 is that the shock proof method for the rewritable optical disc can rewrite the prior N blocks of problematic recorded data caused by shocks in the stop-writing region so as to enhance the recording correctness.

The above-mentioned step mainly utilizes the shock signal to enable the interrupted recording procedure and link recording procedure. The interrupted recording procedure and link recording procedure are disclosed in the Applicant's U.S. patent application Ser. No. 09/800,896, which was filed on Mar. 8, 2001 and entitled "LINK WRITING METHOD FOR A RECORDABLE COMPACT DISK AND DRIVER FOR USING THE METHOD" to control recording of link connection after the shock is eliminated.

In the above-mentioned steps, steps S218 and S318 mainly identify whether or not shocks have occurred again during the writing position seeking process so as to ensure that the continuous recording process of steps S206 and S306 will not fail owing to shocks. Of course, these steps also may be omitted.

While certain exemplary embodiments have been described and shown in the accompanying drawings, it is to be understood that such embodiments are merely illustrative of and not restrictive on the broad invention, and that this invention not be limited to the specific construction and arrangement shown and described, since various other modifications may occur to those ordinarily skilled in the art.

What is claimed is:

1. A shock detector for an optical disc recorder, the shock detector comprising:
    a first detecting unit for detecting an amplitude of a first kind of reference signal filtered and for outputting a first detecting signal;
    a second detecting unit for detecting a level of a second kind of reference signal and outputting a second detecting signal;
    a third detecting unit for detecting a revolution of a third kind of reference signal and outputting a third detecting signal; and
    a judging unit for receiving the first, the second and the third detecting signals, and for enabling a shock signal when the first, the second and the third detecting signals are simultaneously enabled.

2. The shock detector according to claim 1, wherein the first detecting unit comprises:
    a band-pass filter for receiving the first kind of reference signal and outputting a first eigenvalue; and
    hysteresis comparators for receiving the first eigenvalue, enabling the first detecting signal when the first eigenvalue is greater than a first high threshold value or smaller than a second low threshold value, and disabling the first detecting signal when the first eigenvalue is smaller than a first low threshold value and greater than a second high threshold value;
    wherein the first low threshold value is greater than the second high threshold value.

3. The shock detector according to claim 1, wherein the first detecting unit comprises:
    a band-pass filter for receiving the first kind of reference signal and outputting a first eigenvalue; and
    comparators for receiving the first eigenvalue, enabling the first detecting signal when the first eigenvalue is greater than a first threshold value or smaller than a second threshold value, and disabling the first detecting signal when the first eigenvalue is smaller than the first threshold value and greater than the second threshold value;
    wherein the first threshold value is greater than the second threshold value.

4. The shock detector according to claim 2, wherein the first kind of reference signal is a tracking error signal.

5. The shock detector according to claim 2, wherein the first kind of reference signal is a focusing error signal.

6. The shock detector according to claim 2, wherein the first kind of reference signal is a central error signal.

7. The shock detector according to claim 1, wherein the second detecting unit comprises:
    a low-pass filter for receiving the second kind of reference signal and outputting an average value;
    a subtracter for computing differences between the second kind of reference signal and the average value and outputting the difference as a second eigenvalue; and
    a hysteresis comparator for receiving the second eigenvalue, enabling the second detecting signal when the second eigenvalue is greater than a third high threshold value, and disabling the second detecting signal when the second eigenvalue is smaller than a third low threshold value.

8. The shock detector according to claim 1, wherein the second detecting unit comprises:
    a low-pass filter for receiving the second kind of reference signal and outputting an average value;

a subtracter for computing differences between the second kind of reference signal and the average value and outputting the difference as a second eigenvalue; and a comparator for receiving the second eigenvalue, enabling the second detecting signal when the second eigenvalue is greater than a third threshold value, and disabling the second detecting signal when the second eigenvalue is smaller than the third threshold value.

9. The shock detector according to claim 7, wherein the second kind of reference signal is a sub-beam sum signal.

10. The shock detector according to claim 7, wherein the second kind of reference signal is a RF ripple signal.

11. The shock detector according to claim 1, wherein the third detecting unit comprises:

a counter for receiving the third kind of reference signal and outputting revolution length of the third kind of reference signal;

an averaging unit for receiving the revolution length and generating an average signal;

a subtracter for computing difference between the revolution length and the average signal, and outputting the difference as a third eigenvalue; and a hysteresis comparator for receiving the third eigenvalue, enabling the third detecting signal when the third eigenvalue is greater than a fourth high threshold value, and disabling the third detecting signal when the third eigenvalue is smaller than a fourth low threshold value.

12. The shock detector according to claim 1, wherein the third detecting unit comprises:

a counter for receiving the third kind of reference signal and outputting revolution length of the third kind of reference signal;

an averaging unit for receiving the revolution length and generating an average signal;

a subtracter for computing difference between the revolution length and the average signal, and outputting the difference as a third eigenvalue; and a comparator for receiving the third eigenvalue, enabling the third detecting signal when the third eigenvalue is greater than a fourth threshold value, and disabling the third detecting signal when the third eigenvalue is smaller than the fourth threshold value.

13. The shock detector according to claim 11, wherein the third kind of reference signal is a spindle motor rotating frequency identifying signal.

14. The shock detector according to claim 1, wherein the judging unit is an AND gate.

15. A method for controlling optical disc recording according to a shock signal to keep the recording quality, the method comprising the steps of:

detecting an amplitude of a first kind of reference signal filtered and outputting a first detecting signal;

detecting a level of a second kind of reference signal and outputting a second detecting signal;

detecting a revolution of a third kind of reference signal and outputting a third detecting signal; and enabling the shock signal when the first, the second and the third detecting signals are simultaneously enabled otherwise disabling the shock signal;

executing normal recording process when the shock signal is disabled and a recording mode is a normal mode;

changing the recording mode as an interrupt mode and enabling an interrupt recording process when the shock signal is enabled and the recording mode is the normal mode; and detecting the shock signal when the shock signal is enabled during the interrupt mode; and changing the recording mode as the normal mode and enabling a link recording process when the shock signal is disabled during the interrupt mode.

16. The method according to claim 15, further comprising the step of setting a servo-loop with a high gain when the recording mode is the interrupt mode.

17. The method according to claim 16, further comprising the step of setting a servo-loop with a normal gain when the recording mode is the normal mode.

18. The method according to claim 15, further comprising the step of storing N blocks of encoded buffer data when the interrupt recording process is enabled.

19. The method according to claim 18, further comprising the step of starting recording the stored N blocks of encoded buffer data from the N-th block prior to a stop-writing position.

20. A shock detector for an optical disc recorder, the shock detector comprising:

a detecting unit for detecting a revolution of a reference signal and outputting a detecting signal a shock signal wherein the reference signal is a spindle motor rotating frequency identifying signal;

wherein the detecting unit comprises:

a counter for receiving the reference signal and outputting revolution length of the reference signal;

an averaging unit for receiving the revolution length and generating an average signal;

a subtracter for computing difference between the revolution length and the average signal, and outputting the difference as an eigenvalue; and a hysteresis comparator for receiving the eigenvalue, enabling the detecting signal when the eigenvalue is greater than a high threshold value, and disabling the detecting signal when the eigenvalue is smaller than a low threshold value.

21. A shock detector for an optical disc recorder, the shock detector comprising:

a detecting unit for detecting a revolution of a reference signal and outputting a detecting signal a shock signal wherein the reference signal is a spindle motor rotating frequency identifying signal;

wherein the detecting unit comprises:

a counter for receiving the reference signal and outputting revolution length of the reference signal;

an averaging unit for receiving the revolution length and generating an average signal;

a subtracter for computing difference between the revolution length and the average signal, and outputting the difference as an eigenvalue; and a comparator for receiving the eigenvalue, enabling the detecting signal when the eigenvalue is greater than a threshold value, and disabling the detecting signal when the eigenvalue is smaller than the threshold value.

* * * * *